UNITED STATES PATENT OFFICE.

BYRON B. GOLDSMITH, OF NEW YORK, N. Y.

THERMOPLASTIC COMPOUND AND METHOD OF MAKING SAME.

No. 924,057. Specification of Letters Patent. Patented June 8, 1909.

Application filed October 7, 1907. Serial No. 396,191.

*To all whom it may concern:*

Be it known that I, BYRON B. GOLDSMITH, a citizen of the United States, residing in the borough of Manhattan, city, county, and State of New York, have invented a certain new and useful Improvement in Thermoplastic Compounds and Methods of Making Same, of which the following is a specification.

This invention has relation to an improved thermoplastic compound formed by treatment of vegetable albuminoids and proteids such as gluten (for instance from wheat, rye, barley, potatoes etc.) vegetable ivory nut, zein (from maize) and legumin (from peas and beans).

In my U. S. Patent Number 840,931, dated January 8th, 1907, I have described a process whereby a thermoplastic compound may be made from casein or its derivatives, as a convenient and cheap substitute for celluloid, rubber and the like; and I made it clear in said patent that the term "thermoplastic" was meant to describe those masses which, while reasonably hard at ordinary temperatures, are rendered soft by heat, so as to permit the uniting of separate masses, and the molding of any mass to any desired shape.

My present invention is based upon the discovery that the results obtained by the method described in said patent as applied to casein can also be reached by a similar treatment of gluten (crude or refined) and the other vegetable albuminoids or proteids as well as their derivatives and compounds.

Shortly stated, my invention involves the modification of the properties of these proteid bodies by uniting them with converting agents under conditions of heat and pressure, for the production of a thermoplastic composition of matter, useful in the manufacture of molded articles of many kinds, and supplying a cheap and superior substitute for celluloid, rubber etc.

The term "converting agent" as used in my present specification and claims covers any substance which, when combined or admixed with a vegetable proteid or albuminoid, acts, when heated, to soften the same, but whose softening action is suspended or materially diminished upon lowering the temperature of the mass. The term "vegetable albuminoid" as used in the present specification and claims covers all vegetable proteids, whether refined or crude, together with their derivatives and compounds.

Among the converting agents which I have found useful are alphanaphthol, beta-naphthol, benzoic acid, carbolic acid, hydrochinon, kresol, pyrocatechin, resorcin, salicyclic acid, urea, benzoic acid, phthalic acid, phloroglucin, pyrogallol, paratoluidin, naphthylamin, benzidin, oxy-naphthoic acid, anilin, toluidin and xylidin. It is to be understood however that I do not limit myself to these, but that my invention covers the use of equivalents of these substances and has the scope heretofore explained. The mode of action of these converting agents is not altogether clear. In some cases it is probably due to partial solution of the albuminoid when heated, but I do not confine myself to any theory of action; nor is it essential to my invention whether or not there is a chemical combination between the albuminoid and the converting agent.

One characteristic of a "converting agent" is its capacity to remain in the mass and not be volatilized to a material extent when moderate heat is applied. I have discovered that the best results are obtained by the use of solid reagents, such as alpha or beta naphthol and I have claimed this variant of my process and product specifically herein. Where flexibility is desired in the product, however, I have discovered that a liquid converting agent or liquids not antagonistic to the mixture may be combined with a solid agent to great advantage. The best results are obtained from converting agents which are non-volatile at ordinary temperatures, such, for instance, as beta-naphthol. I have found that such converting agents produce a permanently thermoplastic mass, whereas the mass produced with volatile converting agents only loses its thermoplasticity. Certain converting agents are better adapted to be used with some vegetable albuminoids than others, and in many cases the derivatives of vegetable proteids or their compounds, or combinations of two or more vegetable proteids (their derivatives or compounds) give results superior to those resulting from use of a single unchanged vegetable proteid. Moreover it is not necessary that a vegetable proteid should be isolated or refined for the purposes of my process, but in many cases the material containing them can be used. For instance whole wheat flour may be used for mixing with the converting agent. In my claims it is to be understood that the word "albuminoid" includes a combination or mixture of albuminoids and is not confined to the use of a single kind in any given composition. The properties of the thermoplastic compound in the cold state will vary with the particular converting agent employed and with the proportions used. Thus a great variety of characteristics are obtainable by suitable variations in proportions and qualities.

In the manufacture of my present composition the vegetable proteids or their derivatives undergo the same treatment as is described in my aforesaid patent in connection with casein; that is to say that they may be united with the converting agent on or between suitably heated rolls. Any other method may be used whereby these substances are brought into intimate contact. Instead of using the converting agents in their natural state, they may be first dissolved in alcohol, water, or other suitable liquid which is afterward driven off by heat. One of the practicable proportions which I have used is the following: Take a quantity of gluten, which would weigh four pounds if dried and sprinkle the same with one pound of beta-naphthol dissolved in alcohol. This is then well mixed, preferably on suitably heated rolls, and, when the mixture is completed, the mass is removed and is soft while hot but hardens on cooling. Scraps of substances of various nature may be mixed in with the masses thus formed in considerable quantities. Among these are celluloid scraps, finely divided albuminoids, bits of horn, rubber, resins, gums and coloring matter. Compounding substances or fillers can also be incorporated without departing from this invention.

I have found that, in order to produce the best results, the converting agent or agents employed should be "non-hygroscopic," by which I mean that they should not have the property of extracting moisture from the atmosphere. For this reason I have made specific claims for the use of non-hygroscopic converting agents.

What I claim is—

1. The process of making a thermoplastic composition of matter which consists in intimately mixing a converting agent with vegetable albuminoid and subjecting the mixture to pressure, substantially as described.

2. The process of making a thermoplastic composition of matter which consists in adding to a vegetable albuminoid a converting agent and then heating and pressing the combined ingredients, substantially as described.

3. The process of producing a thermoplastic composition of matter which consists in adding beta-naphthol or its equivalent to a vegetable albuminoid and subjecting the combined ingredients to simultaneous heat and pressure, substantially as described.

4. The process of producing a thermoplastic composition of matter which consists in intimately mixing beta-naphthol or its equivalent with vegetable albuminoid and subjecting the mixture to pressure, substantially as described.

5. The process of making a thermoplastic composition of matter which consists in intimately mixing a non-hygroscopic converting agent with a vegetable albuminoid and subjecting the mixture to pressure, substantially as described.

6. The process of making a thermoplastic composition of matter which consists in uniting gluten with a normally solid converting agent and subjecting the mass to heat and pressure, substantially as described.

7. The process of making a thermoplastic composition of matter which consists in uniting a vegetable albuminoid with a non-hygroscopic converting agent, substantially as described.

8. The process of making a thermoplastic composition of matter which consists in uniting a vegetable albuminoid with a normally solid non-hygroscopic converting agent with heat and pressure, substantially as described.

9. The process of making a thermoplastic composition of matter which consists in uniting gluten with a normally solid non-hygroscopic converting agent and then subjecting the mass to heat and pressure, substantially as described.

10. The process of making a relatively pliable thermoplastic composition of matter which consists in uniting a vegetable albuminoid with a normally solid converting agent and a normally liquid converting agent, and subjecting the mass to heat and pressure, substantially as described.

11. A composition of matter consisting of a thermoplastic vegetable albuminoid, substantially as described.

12. A composition of matter consisting of a vegetable albuminoid united with beta-naphthol or its equivalent, substantially as described.

13. A composition of matter consisting of gluten and a converting agent, substantially as described.

14. A composition of matter consisting of vegetable albuminoid and a converting agent, substantially as described.

15. A composition of matter consisting of gluten and beta-naphthol or its equivalent, substantially as described.

16. A composition of matter consisting of a vegetable albuminoid and a normally solid converting agent, substantially as described.

17. A composition of matter consisting of a vegetable albuminoid, a normally solid converting agent and a normally liquid converting agent, substantially as described.

18. A composition of matter consisting of a vegetable albuminoid and a non-hygroscopic converting agent, substantially as described.

19. A composition of matter consisting of thermoplastic gluten, substantially as described.

20. A composition of matter consisting of gluten and a normally solid converting agent, substantially as described.

21. A composition of matter consisting of gluten, a normally solid converting agent and a normally liquid converting agent, substantially as described.

22. A composition of matter consisting of gluten and a non-hygroscopic converting agent, substantially as described.

23. A composition of matter consisting of gluten and a normally solid non-hygroscopic converting agent, substantially as described.

24. The process of making a thermoplastic composition of matter which consists in intimately mixing a vegetable albuminoid with a converting agent which is non-volatile at ordinary temperatures, substantially as described.

25. A composition of matter which consists of a vegetable albuminoid united with a converting agent which is non-volatile at ordinary temperatures, substantially as described.

BYRON B. GOLDSMITH.

Witnesses:
H. S. MACKAYE,
M. A. BUTLER.